(12) United States Patent
Bohse

(10) Patent No.: US 8,505,951 B2
(45) Date of Patent: Aug. 13, 2013

(54) HITCH MOUNTED WASTE CONTAINER TRANSPORTER

(76) Inventor: Marc A. Bohse, New Madison, OH (US)

( * ) Notice: Subject to any disclaimer, the term of this patent is extended or adjusted under 35 U.S.C. 154(b) by 75 days.

(21) Appl. No.: 13/312,314

(22) Filed: Dec. 6, 2011

(65) Prior Publication Data

US 2013/0140794 A1 Jun. 6, 2013

(51) Int. Cl.
*B60P 9/00* (2006.01)
(52) U.S. Cl.
USPC .......... 280/491.1; 280/504; 414/462; 224/519
(58) Field of Classification Search
USPC ... 280/491.5, 402, 490.1, 504; 224/401–411, 224/519; 414/462
See application file for complete search history.

(56) References Cited

U.S. PATENT DOCUMENTS

| | | | |
|---|---|---|---|
| 4,773,812 A | 9/1988 | Bayne | |
| 6,361,264 B1 * | 3/2002 | Guthrie et al. | 414/462 |
| 7,018,155 B1 | 3/2006 | Heberling et al. | |
| 7,101,142 B2 | 9/2006 | Bik | |
| 7,217,078 B2 * | 5/2007 | Short | 414/462 |
| 7,614,637 B1 | 11/2009 | Kidd | |
| 2004/0164517 A1 * | 8/2004 | Lewy et al. | 280/493 |
| 2005/0161906 A1 * | 7/2005 | Thelen | 280/504 |
| 2007/0170218 A1 * | 7/2007 | Robb | 224/519 |
| 2007/0221695 A1 * | 9/2007 | Winkler | 224/519 |
| 2008/0101899 A1 * | 5/2008 | Slonecker | 414/462 |
| 2012/0325876 A1 * | 12/2012 | Hill | 224/401 |

* cited by examiner

*Primary Examiner* — Tony Winner
(74) *Attorney, Agent, or Firm* — R. William Graham

(57) ABSTRACT

A hitch mounted waste container transporter for mounting in a standard hitch receiver on a vehicle using a locking pin includes a hitch bar having a first end equipped for connection to the hitch receiver and having a distal end, a hitch bar bracket having a lower end rigidly connected to said distal end of the hitch bar and an upper end which includes a transverse locking pin, an intermediate bar is pivotally connected at its first end to the hitch bar bracket such that the intermediate bar moves between about 0 and 25 degrees from a common axis of the hitch bar, and a rigid container support bar connected to a second end of the intermediate bar which is about 110-115 degrees obtuse to the axis of the intermediate bar having a tine to removably engage a waste container.

17 Claims, 2 Drawing Sheets

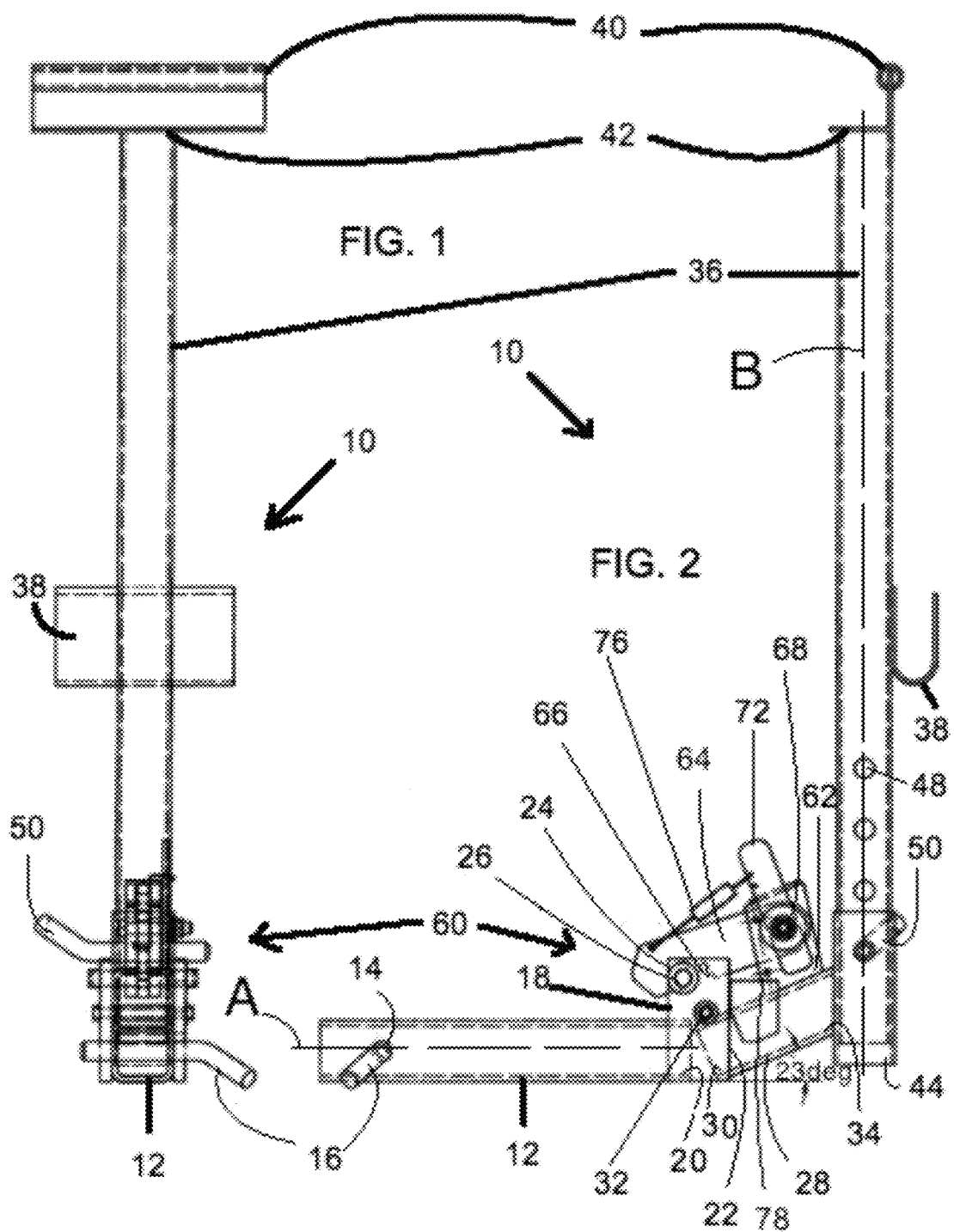

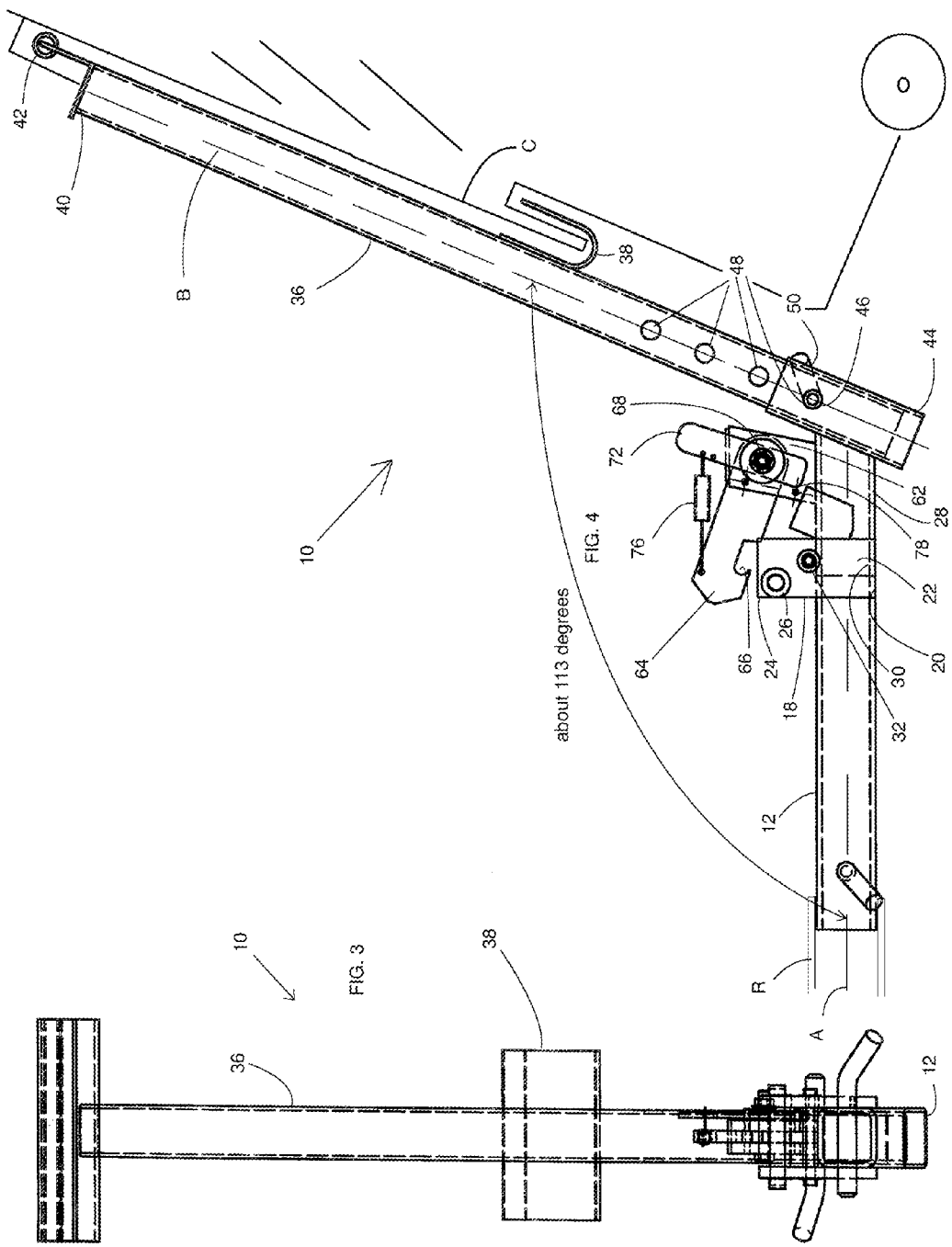

HITCH MOUNTED WASTE CONTAINER TRANSPORTER

BACKGROUND OF THE INVENTION

1. Field of the Invention

This invention relates generally to the field of household waste container hauling and, more particularly, but not by way of limitation, to a device mountable on a conventional trailer hitch for lifting and carrying a typical household waste container by carrying the container behind a motor vehicle.

2. Description of the Related Art

Waste containers are used by household and commercial establishments and is regularly picked up by a waste management company, for instance, on a weekly basis. Automation of collection devices for containers is a common part waste management. Waste and recycling companies have developed standardized containers that employ an integrated attachment recess and restraining bar. The containers are constructed of tough plastic and include molded into one side of the container a horizontal bar mounted for aiding in lifting. The trucks are equipped with a robotic arm which can be inserted into a recess between the bar and container and engages the same for automatically hoisting the container in an arc to dump the container into a truck bin.

These waste containers are typically very large and when full of waste render them too heavy to lift. Such containers have wheels for aiding in pick-up storage. The containers also have a hinged lid that swings open in the dumping cycle and is otherwise hand opened. The hinge of the lid normally incorporates one or more handles for tilting the container onto its wheels and is commonly positioned vertically over the wheels.

The lack of easy transportability of the containers can be problematic. For such pickup, the waste containers from the household or the commercial establishment must be taken to the roadside for picking up by the waste collection truck. However, the waste container may be quite a distance from the road or area where they are picked up by the truck and it can be burdensome particularly in inclement weather to wheel or drag the waste container to the point of pickup. This is particularly so in rural areas where the containers may need to be moved some distance to a main road for collection by the refuse company.

While some devices exist to aid in this regard, there is a need to provide an improved device mountable on a conventional trailer hitch for lifting and transporting a typical household waste container.

SUMMARY OF THE INVENTION

It is an object to improve waste removal.

It is another object to improve the devices for aiding in waste removal.

It is therefore an object to provide a device mountable on a conventional trailer hitch for lifting and transporting a typical household waste container.

An embodiment of the invention is directed to a hitch mounted waste container transporter. The transporter includes a hitch bar with an opening therethrough for mounting in a standard hitch receiver on a vehicle using a locking pin. A hitch bar bracket connected to a distal end of the hitch bar.

The hitch bar bracket includes a lower end rigidly connected to the distal end of the hitch bar and an upper end which includes a transverse locking pin. An intermediate bar is pivotally connected at a first end to the bracket preferably such that the intermediate bar moves between about 0 and 25 degrees from a common axis of the hitch bar.

A second end of the intermediate bar is connected to a rigid container support bar which is about 110-115 degrees and preferably about 113 degrees obtuse to the axis of the intermediate bar. The support bar has an outwardly facing hook mounted thereto its mid section and horizontal support member mounted to a distal end of the support bar.

Preferably, a rigid sleeve is mounted to the second end of the intermediate bar and includes a transverse opening extending therethough. The support bar can likewise include one or more transverse openings which can selectively be coaligned with the opening of the sleeve. A lock pin can provided to insert through coaligned openings to secure the relative position of the support bar to the sleeve. Thus a height adjustability is provided by this combination to accommodate various containers and adjustment is to compensate for the variability of hitch heights on various vehicles.

Additionally, to the intermediate bar is connected to a retaining mechanism which can be actuated to engage the locking pin of the hitch bar bracket. The retaining mechanism can include a retaining bracket connected to the intermediate bar, a locking jaw having a mouth to removably receive about the locking pin, wherein the locking jaw is pivotally connected to the retaining bracket. A lever connects to the retaining bracket at a common pivot point to the locking jaw and operably connected to the lever by a spring. In this way, the lever can be pulled back to release the locking jaw when engaged to the locking pin and retained open by virtue of the spring. This allows the support bar and intermediate bar to move to a loading position wherein the support bar moves from a generally 90 degree position relative to the hitch bar to an obtuse position permitting easier connection to a waste container. Once connected to the waste container, the container and support bar can be pushed using the pivotal connection of the intermediate bar and hitch bracket as a fulcrum easily enabling the locking jaw to reach the locking pin whereupon so doing the spring is automatically disengaged and the device with waste can is locked in position for transport.

BRIEF DESCRIPTION OF THE DRAWINGS

The invention will now be described, by way of example, with reference to the accompanying drawings, in which:

FIG. 1 is a front elevational view of the present invention in a closed transport position.

FIG. 2 is a side elevational view of the present invention in a closed transport position.

FIG. 3 is a front elevational view of the present invention in an open loading position.

FIG. 4 is a perspective elevational view of the present invention in an open loading position.

DETAILED DESCRIPTION OF THE PREFERRED EMBODIMENT

Referring now to the drawings, the present invention discloses a hitch mounted waste container transporter for use in transporting a refuse container for a short distance, such as on a driveway and is generally designated by the numeral 10. The transporter 10 includes a hitch bar 12 with an opening 14 therethrough for mounting in a standard hitch receiver R on a vehicle using a locking pin 16. A hitch bar bracket 18 connected to a distal end 20 of the hitch bar 12. The hitch bar bracket 18 includes a lower end 22 rigidly connected to the distal end 20 of the hitch bar 12 and an upper end 24 which includes a transverse locking pin 26.

An intermediate bar 28 is pivotally connected at a first end 30 to the hitch bracket 18 at a pivot bar 32. In this way, the intermediate bar 28 moves between about 0 and 25 degrees from a common axis A of the hitch bar 12.

A second end 34 of the intermediate bar is connected to a rigid container support bar 36 which is about 110-115 degrees and preferably about 113 degrees obtuse to the axis of the intermediate bar 28 as can be seen in FIG. 2. The support bar 36 has tine or an outwardly facing hook 38 mounted thereto its mid section and horizontal support member 40 mounted to a distal end 42 of the support bar 36.

Preferably, a rigid sleeve 44 is mounted to the second end 34 of the intermediate bar 28 and includes a transverse opening 46 extending therethough. The support bar 36 can likewise include one or more transverse openings 48 which can selectively be coaligned with the opening 46 of the sleeve 44. A lock pin 50 can provided to insert through coaligned openings 46 and 48 to secure the relative position of the support bar 36 to the sleeve 44. Thus a height adjustability is provided by this combination to accommodate various containers and adjustment is to compensate for the variability of hitch heights on various vehicles.

Additionally, to the intermediate bar 28 is connected to a retaining mechanism 60 which can be actuated to engage the locking pin 26 of the hitch bar bracket 18. The retaining mechanism 60 can include a retaining bracket 62 connected to the intermediate bar 28, a locking jaw 64 having a mouth 66 to removably receive about the locking pin 26, wherein the locking jaw 64 is pivotally connected to the retaining bracket 62 by a bolt, spring washer and nut (collectively 68) wherein the locking jaw 64 includes a bolt receiving surface 70. The spring washer and nut 68 keep pressure on the lever 72 to maintain engagement. To release the jaw 64, one applies pressure to lever 72 in a backward direction.

A lever 72 connects to the retaining bracket 62 at a common pivot point (bolt) to the locking jaw 64 and operably connected to the lever 72 by a spring 76. In this way, the lever 72 can be pulled back to release the locking jaw 64 when engaged to the locking pin 26 and retained open by virtue of the spring 76 and stop 78. This allows the support bar 36 and intermediate bar 28 to move to a loading position as seen in FIG. 2 wherein the support bar 36 moves from a generally 90 degree position relative to the hitch bar 12 as seen in FIG. 4 to an obtuse position permitting easier connection to a waste container as seen in FIG. 2. Once connected to the waste container C, the container C and support bar 36 can be pushed using the pivotal connection 32 of the intermediate bar 28 and hitch bracket 18 as a fulcrum easily enabling the locking jaw 64 to reach the locking pin 26 whereupon so doing the spring 76 is automatically disengaged and the device 10 with waste can C is locked in position for transport.

Thus, a hitch mechanism is provided which interconnects the lower end of the rigid container support bar 12 and the distal end of the hitch bar 12 in a manner to permit said rigid support bar 36 a limited range of movement between a transporting position and a loading position where upon assuming the loading position, longitudinal axis B of rigid container support bar is at an obtuse angle with respect to longitudinal axis A of the hitch bar 12.

By virtue of the present invention a device for transporting a heavy wheeled trash container behind a vehicle from a home, or a business to the curbside is more readily accomplished. The device 10 greatly simplifies movement of a large trash containers, thereby saving time and effort for homeowners. It is particularly suitable for use by individuals living in rural areas that have long driveways since the garbage container would not have to be carried, lifted, or dragged for a long distance.

While the present invention specially designed tow hitches having a square steel tubular receiver, other hitch configurations are conceivable. Once the present invention hitching device is secured to the vehicle and the trash can attached, an individual can slowly drive along the driveway while carrying the heavy container with the wheels off the ground to the curbside for drop off.

The present invention improves on the art in better enabling loading a trash container for carrying a trash container down a long driveway. The present invention device 10 can be suitable fabricated in a metallic or alloy material for example. The presenting invention refuse container hitching device has therefore been amply described in the above descriptions and in the appended drawings of FIGS. 1-4.

While the preferred embodiments of the invention have been described above, it will be recognized and understood that various modifications can be made in the invention and the appended claims are intended to cover all such modifications which may fall within the spirit and scope of the invention.

What is claimed is:

1. A hitch mounted waste container transporter for mounting in a standard hitch receiver on a vehicle using a locking pin, which includes:
    a hitch bar having a first end equipped for connection to the hitch receiver and having a distal end;
    a hitch bar bracket having a lower end rigidly connected to said distal end of said hitch bar and an upper end which includes a transverse locking pin;
    an intermediate bar is pivotally connected at its first end to said hitch bar bracket such that the intermediate bar moves between an acute angle range with respect to a common axis of said hitch bar; and
    a rigid container support bar connected to a second end of said intermediate bar which is obtuse to the axis of the intermediate bar having a tine to removably engage a waste container.

2. The hitch mounted waste container transporter of claim 1, wherein said tine is an outwardly facing hook mounted to a mid section thereof and further includes a horizontal support member mounted to a distal end of said support bar.

3. The hitch mounted waste container transporter of claim 1, which includes a rigid sleeve mounted to said second end of said intermediate bar and includes a transverse opening extending therethough and wherein said support bar includes at least one transverse opening which can be coaligned with the opening of said sleeve and a lock pin for insertion through the openings when so coaligned to secure the relative position of said support bar to said sleeve.

4. The hitch mounted waste container transporter of claim 1, wherein said intermediate bar connects to a retaining mechanism which actuates to removable engage said transverse locking pin of said hitch bar bracket.

5. The hitch mounted waste container transporter of claim 4, wherein said retaining mechanism includes a retaining bracket connected to said intermediate bar, a locking jaw having a mouth to removably receive about said transverse locking pin, wherein said locking jaw is pivotally connected to said retaining bracket.

6. The hitch mounted waste container transporter of claim 5, wherein said retaining mechanism includes a lever connected to said retaining bracket at a common pivot point to said locking jaw and operably connects to said lever by a spring such that said lever actuates to release said locking jaw when engaged to the locking pin and retains said locking jaw open by virtue of said spring.

7. The hitch mounted waste container transporter of claim 1, wherein said obtuse angle is between about 110-115 degrees.

8. The hitch mounted waste container transporter of claim 1, wherein said acute angle is between about 0 and 25 degrees from the common axis of said hitch bar.

9. A hitch mounted waste container transporter for mounting in a standard hitch receiver on a vehicle using a locking pin, which includes:
   a hitch bar having a first end equipped for connection to the hitch receiver and having a distal end;
   a hitch bar bracket having a lower end rigidly connected to said distal end of said hitch bar and an upper end which includes a transverse locking pin;
   an intermediate bar is pivotally connected at its first end to said hitch bar bracket such that the intermediate bar moves between about 0 and 25 degrees from a common axis of said hitch bar; and
   a rigid container support bar connected to a second end of said intermediate bar which is obtuse to the axis of the intermediate bar having a tine to removably engage a waste container.

10. The hitch mounted waste container transporter of claim 9, wherein said tine is an outwardly facing hook mounted to a mid section thereof and further includes a horizontal support member mounted to a distal end of said support bar.

11. The hitch mounted waste container transporter of claim 9, which includes a rigid sleeve mounted to said second end of said intermediate bar and includes a transverse opening extending therethough and wherein said support bar includes at least one transverse opening which can be coaligned with the opening of said sleeve and a lock pin for insertion through the openings when so coaligned to secure the relative position of said support bar to said sleeve.

12. The hitch mounted waste container transporter of claim 9, wherein said intermediate bar connects to a retaining mechanism which actuates to removable engage said locking pin of said hitch bar bracket.

13. The hitch mounted waste container transporter of claim 12, wherein said retaining mechanism includes a retaining bracket connected to said intermediate bar, a locking jaw having a mouth to removably receive about said transverse locking pin, wherein said locking jaw is pivotally connected to said retaining bracket.

14. The hitch mounted waste container transporter of claim 13, wherein said retaining mechanism includes a lever connected to said retaining bracket at a common pivot point to said locking jaw and operably connects to said lever by a spring such that said lever actuates to release said locking jaw when engaged to said transverse locking pin and retains said locking jaw open by virtue of said spring.

15. A hitch mounted waste container transporter for mounting in a standard hitch receiver on a vehicle using a locking pin, which includes:
   a hitch bar having a first end equipped for connection to the hitch receiver and having a distal end;
   a rigid container support bar pivotally connected at a lower end to said distal end hitch bar;
   a hitch mechanism interconnecting said lower end of said rigid container support bar and said distal end of said hitch bar in a manner to permit said rigid container support bar a limited range of movement between a transporting position and a loading position where upon assuming said loading position, a longitudinal axis said of rigid container support bar is at an obtuse angle with respect to a longitudinal axis of said hitch bar; and
   an outwardly facing hook on said rigid container support bar mounted to a mid section thereof and further includes a horizontal support member mounted to a distal end of said support bar.

16. A hitch mounted waste container transporter for mounting in a standard hitch receiver on a vehicle using a locking pin, which includes:
   a hitch bar having a first end equipped for connection to the hitch receiver and having a distal end;
   a rigid container support bar pivotally connected at a lower end to said distal end hitch bar;
   a hitch mechanism interconnecting said lower end of said rigid container support bar and said distal end of said hitch bar in a manner to permit said rigid container support bar a limited range of movement between a transporting position and a loading position where upon assuming said loading position, a longitudinal axis said of rigid container support bar is at an obtuse angle with respect to a longitudinal axis of said hitch bar; and
   a rigid sleeve interconnecting said distal end of said hitch bar and said lower end of said rigid container support bar and includes a transverse opening extending therethough and wherein said support bar includes at least one transverse opening which can be coaligned with the opening of said sleeve and a lock pin for insertion through the openings when so coaligned to secure the relative position of said support bar to said sleeve.

17. A hitch mounted waste container transporter for mounting in a standard hitch receiver on a vehicle using a locking pin, which includes:
   a hitch bar having a first end equipped for connection to the hitch receiver and having a distal end;
   a rigid container support bar pivotally connected at a lower end to said distal end hitch bar;
   a hitch mechanism interconnecting said lower end of said rigid container support bar and said distal end of said hitch bar in a manner to permit said rigid container support bar a limited range of movement between a transporting position and a loading position where upon assuming said loading position, a longitudinal axis said of rigid container support bar is at an obtuse angle with respect to a longitudinal axis of said hitch bar; and
   wherein said hitch mechanism includes a retaining bracket, a locking pin, a locking jaw having a mouth to removably receive about said locking pin, a lever connected to said retaining bracket at a common pivot point to said locking jaw and operably connects to said lever by a spring such that said lever actuates to release said locking jaw when engaged to the locking pin and retains said locking jaw open by virtue of said spring.

* * * * *